Oct. 10, 1950    M. STEINSCHLAEGER    2,525,318
MANUFACTURE OF WATER GAS
Filed June 21, 1945      3 Sheets-Sheet 1
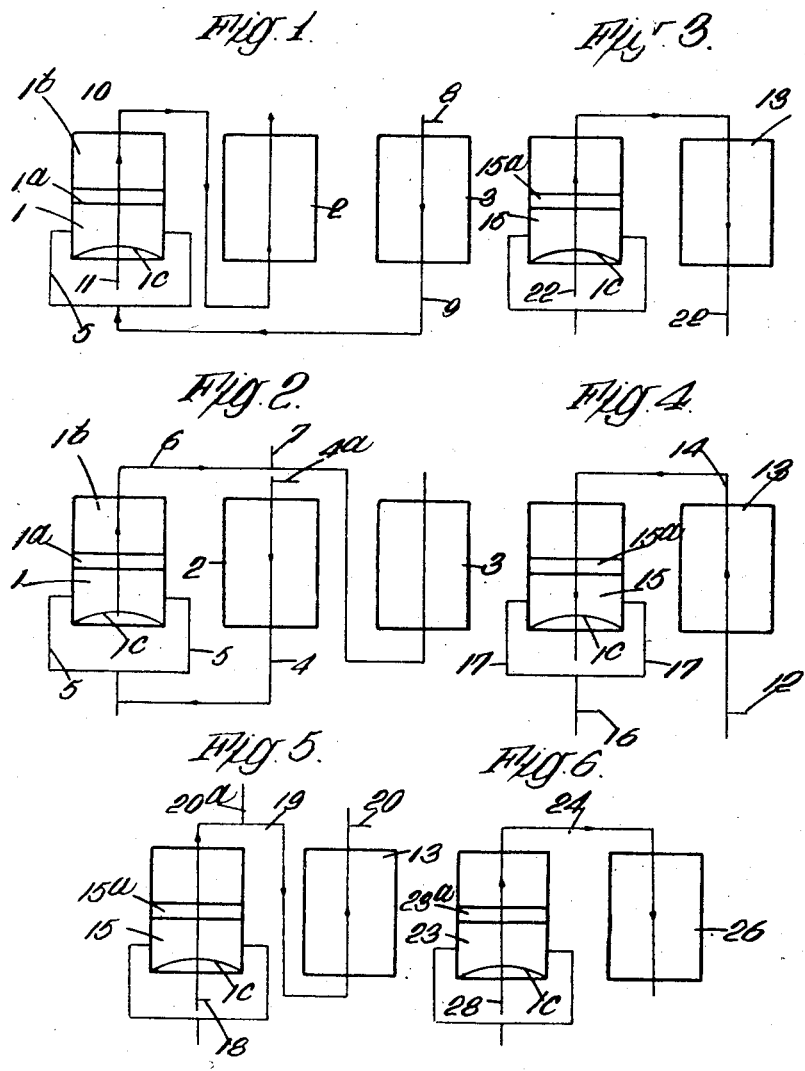
Inventor,
Michael Steinschlaeger

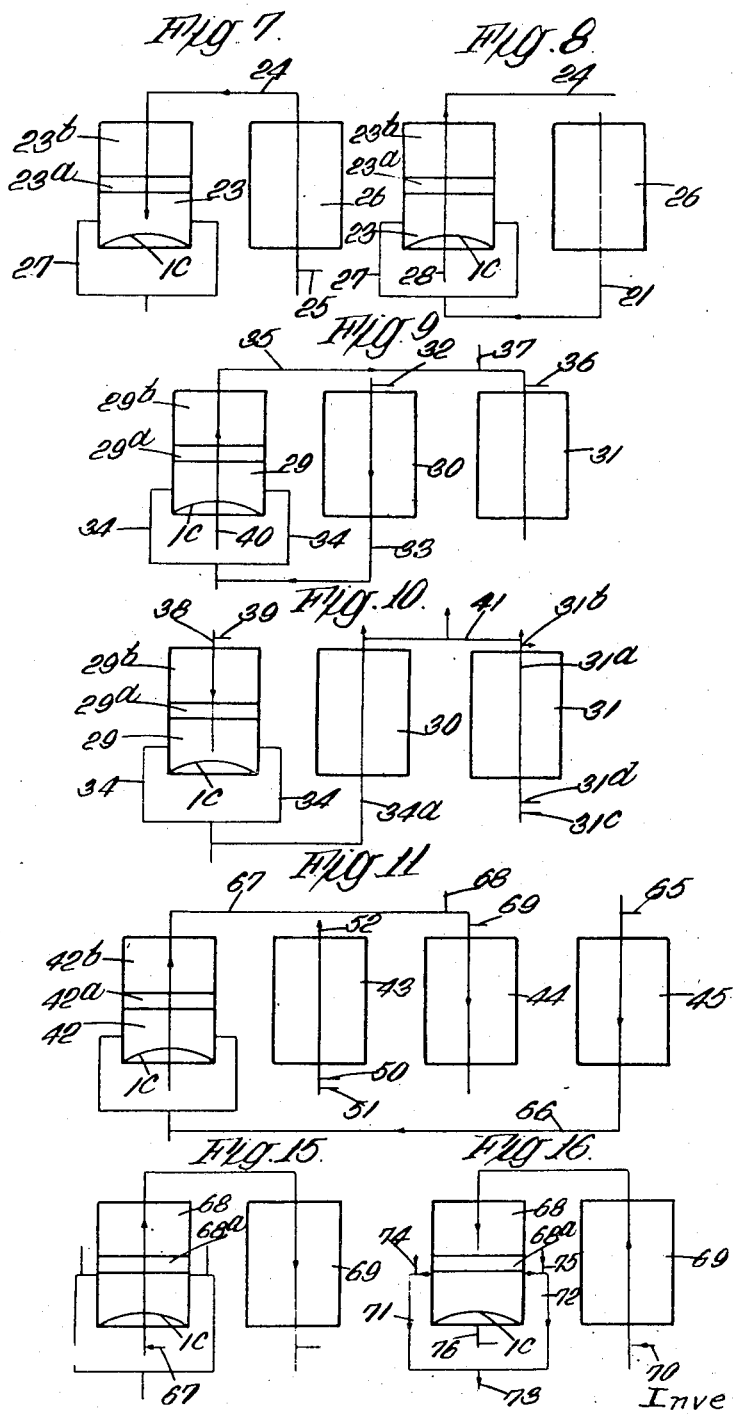

Oct. 10, 1950     M. STEINSCHLAEGER     2,525,318
MANUFACTURE OF WATER GAS
Filed June 21, 1945     3 Sheets-Sheet 3
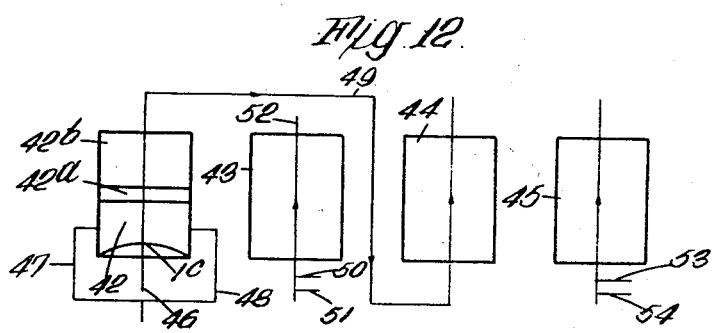
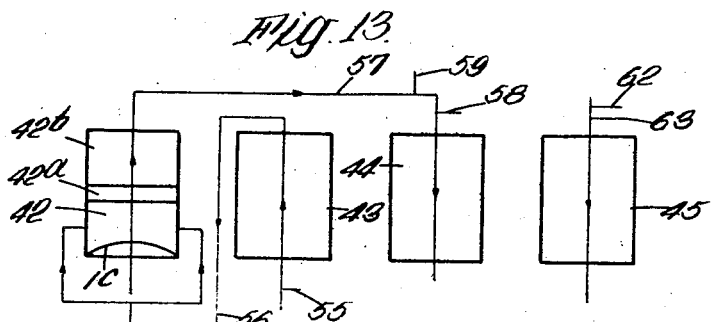
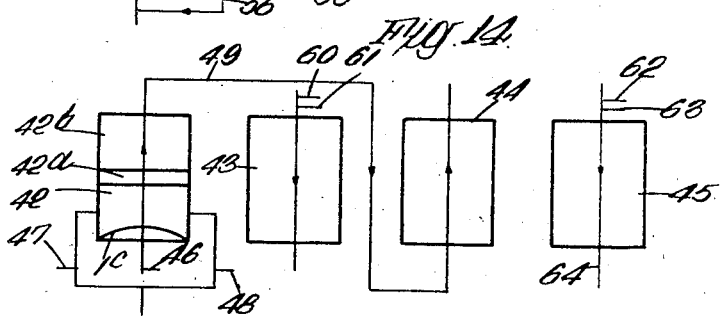
Inventor,
Michael Steinschlaeger
By Young, Emery, Thompson
Attys.

Patented Oct. 10, 1950

2,525,318

UNITED STATES PATENT OFFICE 2,525,318

MANUFACTURE OF WATER GAS

Michael Steinschlaeger, London, England

Application June 21, 1945, Serial No. 600,694
In Great Britain August 11, 1942

1 Claim. (Cl. 48—208)

This invention relates to the manufacture of water gas and like gases such as synthesis gases containing carbon monoxide and hydrogen for example in ratios varying from 1:2 to 2:1 all of which are hereinafter referred to collectively as "water gas" and is a continuation-in-part of my application Serial No. 490,499, now abandoned.

It is well known that for producing water gas or like gases it is advantageous to use superheated steam and preheated air.

It is an object of the present invention to provide a simple and efficient intermittent process for the production of water gas and like gases with the advantages of using preheated air and superheated steam.

According to the present invention an intermittent process is provided for the manufacture of water gas in a generator having an ash bed resting on a grate in the bottom thereof, a reaction zone, and a fuel bed outside the reaction zone which latter is heated by heat stored in said fuel bed; comprising the steps of blasting said reaction zone to incandescence by means of a blast of air passed upwardly through said ash bed hot from a previous operation, alternately with said air blasting admitting steam to the upper portion of said fuel bed outside the reaction zone, drawing off the produced water gas at points outside said reaction zone chosen according to the temperature and sensible heat required in said gas and the amount of heat to be stored in said ash bed, at least a portion of the produced water gas being drawn off above the grate and below the level of the bottom of the reaction zone, controlling the velocity and the temperature of the air of said blast according to the desired temperature and depth of reaction zone and the desired temperature of the blast gases, and discharging ash and clinker from said generator.

If desired the cycle may also include up gas making periods.

In the process of the invention as applied to the production of carburetted water gas preferably the oil and/or gas used for carburetting is cracked by the sensible heat of gases leaving the generator if desired after superheating the same or mixing with other hot gases, before the injection of the aforesaid oil or gas.

Preferably the oil and/or gas used for carburetting is pre-heated.

In the process of the invention as applied to the production of a synthesis gas, preferably gas produced in a gas making period in the generator is mixed with a gas containing carbon monoxide and hydrogen produced in a regenerator which has been wholly or partly heated by the gases leaving the generator in a blasting period.

The process can be applied to generator constructions with hand or mechanically operated ash discharge. The points at which the hot gas, steam or air leave or enter the generator will depend inter alia upon the generator system used. For instance in a generator with mechanically operated ash discharge the hot gases, steam or air may be introduced and removed above the grate. In this case it is also possible to dispense with a jacket boiler.

The velocity of the blast gases and the temperature of the blast gases leaving the reaction zone in the generator is chosen according to the temperature required in the reaction zone and the predetermined depth of the reaction zone and also according to the temperature of the preheated air. The amount of the blast gases is low and for this reason in most cases the pressure will be lower than in generators operating without pre-heated air despite the high velocity of the latter.

The following description shows in greater detail the operation of the process as applied to the production of different gases and using different fuels.

1. *Production of carburetted water gas from coal*

By using coal it is possible to produce a gas which has a higher calorific value than ordinary blue water gas produced from coke.

The operation is illustrated in Figs. 1 and 2 of the accompanying diagrammatic drawings, in which:

Fig. 1 is a flow sheet showing a blasting period, and

Fig. 2 is a similar flow sheet showing an up gas making period.

*Gas making period.*—The gas is made in the up direction. Referring to Fig. 2 of the drawings, steam admitted through line 4a is sent through a superheater 2 by lines 4 and 5 to a generator 1, having a mechanically operated grate 1c, the gases produced and undecomposed steam leaving the reaction zone 1a are used for the carbonisation of the coal 1b above the reaction zone which has been pre-heated to a temperature at which carbonisation begins by the blast gases leaving the reaction zone in the preceding blasting period. If the temperature of the blast gases is too high and so the coal is pre-heated to a higher temperature than is required, the coal can be introduced at a time most suitable to achieve the predetermined temperature or a part or the whole of the blast gases can be brought out at the side and not at the top of the generator.

The sensible heat and the temperature of the mixture of water gas, coal gas, cracked tar and undecomposed steam leaving through line 6 is used and is sufficient to evaporate and crack the oil injected through line 7 (if necessary the oil can be pre-heated, or the amount of undecomposed steam increased or the temperature of the reaction zone increased or the temperature of the gases and undecomposed steam can be increased in a regenerator before injecting the oil or preheated oil). The sensible heat of the carburetted water gas produced is used for heating the regenerator 3 (this heat is used for pre-heating the air required for blasting and secondary combustion).

As the calorific value of the gas produced before injecting the oil is higher than is the case when blue water gas is produced in the hitherto usual manner (the absolute calorific value depends on the composition of the coal used) the amount of the oil used is considerably decreased although the same calorific value is obtained in the carburetted water gas as when using other processes.

*Blasting period.*—Referring to Fig. 1 of the drawings, the air admitted through line 8 is brought through the regenerator 3 by lines 9 and 5 to the generator 1 having a mechanically operated grate 1c and the superheater 2 is heated with the blast gases leaving the generator through line 10. Additional air may be admitted through line 11. The velocity of these gases is so chosen that the predetermined depth and temperature of the reaction zone is obtained.

2. Production of carburetted water gas from coke

The operation is illustrated in Figs. 3 to 5 of the accompanying diagrammatic drawings, in which:

Fig. 3 is a flow sheet showing a blasting period,
Fig. 4 is a similar flow sheet showing a down gas making period, and
Fig. 5 is a similar flow sheet showing an up gas making period.

*Gas making period.*—Referring to Fig. 4 of the drawings, steam admitted through line 12 is sent through a regenerator 13 for superheating and then through line 14 to a generator 15 having a reaction zone 15a and mechanically operated grate 1c. The necessary amount of cold or pre-heated oil is injected through line 16 into the mixture of gas produced and undecomposed steam leaving the generator through lines 17. The sensible heat of the mixture is sufficient to evaporate and crack the oil and no carburettor and superheater are required.

The coke is charged at a time to be sufficiently pre-heated with the blast gases leaving the reaction zone, so as not to cool down to any considerable extent the gases made in the up gas making. The sensible heat of the carburetted water gas produced is used for heating the regenerator and for air pre-heating in the blast period.

*Blasting period.*—Referring to Fig. 3 of the drawings, air is sent via line 22 to the generator 15 having a mechanically operated grate 1c, the blast gases are used to heat the regenerator 13 to the predetermined temperature for steam superheating or for further pre-heating of the gases. The rest of the heat in the blast gases may be used for steam raising. The velocity of the blast gases is so chosen as to obtain the required depth of the reaction zone 15a. The pre-heating of the air can be accomplished wholly or partly by means of the heat stored in the ash.

The up gas making period which is illustrated in Fig. 5 is carried out as follows:

Steam is admitted through line 18 to the generator 15 having a mechanically operated grate 1c. The steam becomes superheated when passing through the ash bed and reacts with the solid fuel in the reaction zone 15a. The gases produced and excess steam leave the generator through line 19 and further steam or water is admitted through line 20a. The gases then pass through the regenerator 13 and oil is admitted through line 20 to produce carburetted water gas.

Instead of steam water can be injected into the superheater so producing the steam with the required temperature and pressure for the reaction and saving the expenditure for a boiler or a part of the expenditure for a boiler. This form of operation is preferable in producing gases of higher calorific value under pressure.

3. Blue water gas production from coke

The operation is illustrated in Figs. 6 to 8 of the accompanying diagrammatic drawings, in which:

Fig. 6 is a flow sheet showing a blasting period.
Fig. 7 is a similar flow sheet showing a down gas making period, and
Fig. 8 is a similar flow sheet showing an up gas making period.

*Down gas making period.*—Referring to Fig. 7 of the drawings, by introducing the steam at the upper part of the generator 23 which has a mechanically operated grate 1c through line 24 (the steam having been admitted through line 25 to the regenerator 26) the steam is superheated with the heat stored in the coke 23b to near the reaction temperature before reaching the reaction zone 23a. The heat stored in the coke is obtained from the blast gases leaving the reaction zone and going to the outlet of the generator. Besides this heat the heat necessary for heating the coke going to the reaction zone is also provided by the blast gases. The sensible heat of the gases produced and undecomposed steam leaving the generator through lines 27 is used for heating a regenerator (not shown).

*Blasting period.*—Referring to Fig. 6 of the drawings, air is sent through a regenerator (not shown) for pre-heating and then this air is brought through line 28 into the generator 23 having a mechanically operated grate 1c in which the air is further pre-heated with heat stored in the ash blasting the reaction zone 23a to the pre-determined temperature. The amount of air used and consequently the temperature of the blast gases leaving the reaction zone and passing through line 24 to regenerator 26 is determined by the heat necessary to store in the coke for superheating the steam in the subsequent gas making period and the pre-heating of the coke for the reaction. The air can also be wholly pre-heated in the ash using one regenerator only for superheating the steam.

*Up gas making period.*—Referring to Fig. 8 of the drawings, steam is sent through the regenerator 26 heated in the blasting period described above and thereby superheated and then introduced at the bottom of the generator 23 which has a mechanically operated grate 1c via lines 21 and 27, additional steam being admitted through line 28. The sensible heat of the gases produced and undecomposed steam leaving the generator through line 24 is used for heating a regenerator (not shown).

4. Production of synthesis gases from coke and gases

The operation is illustrated in Figs. 9 and 10 of the accompanying drawings, in which:

Fig. 9 is a flow sheet showing a blasting period, and
Fig. 10 is a similar flow sheet showing a gas making period.

Referring to Figs. 9 and 10 of the drawings, the plant consists of a generator 29 having a mechanically operated grate 1c and two regenerators 30 and 31 and is operated in the following way: Regenerator 30 is used for pre-heating the air and the regenerator 31 is used for decomposing coke oven gas, carbonisation gases, residual gases, mixtures of these gases or any other gaseous or fluid hydrocarbons or fuels. If necessary the gases before use are freed from carbon dioxide, sulphur compounds, and the like. According to the synthesis process used and the composition of the gases required the above-mentioned fuels are mixed with the steam or carbon dioxide necessary for the decomposition reaction.

*Blasting period.*—Referring to Fig. 9 of the drawings, air or pre-heated air admitted through line 32 is sent through the regenerator 30 and from there via lines 33 and 34 to the generator 29 which has a mechanically operated grate 1c. The blast gases leave the reaction zone 29a with a high temperature and a part of the heat is stored in the coke 29b and used to heat the coke bed to the required temperature. Additional air is admitted through line 40 to the generator 29. The blast gases leaving the generator through line 35 before or after addition of secondary air or pre-heated secondary air admitted through line 36 may be mixed with residual gases or other fuels admitted through line 37 and used for heating the regenerator 31.

*Gas making period.*—The whole or a greater part of the gases is made in the down direction and this is the process illustrated in Fig. 10 of the drawings.

Referring to Fig. 10 of the drawings, steam or carbon dioxide or superheated steam or carbon dioxide or other gases necessary for the reaction is introduced by lines 38 and 39 through the hot coke bed 29b to the reaction zone 29a, thus superheating the steam to near the reaction zone temperature. The gases and the undecomposed steam or carbon dioxide leaving the generator 29 which has a mechanically operated grate 1c via lines 34 and 34a or the gases leaving the regenerator 31 are used for heating the regenerator 30. Regenerator 31 is used for decomposing residual gases (if necessary the residual gas can be freed from carbon dioxide before further treatment), coke oven gases or any other gaseous or liquid hydrocarbons used in the process or any mixture of them. The said gases are admitted through line 31c and 31a and steam and/or carbon dioxide through line 31d. The above-mentioned gases with the exception of the residual gases of the hydrocarbon synthesis are preferably freed from sulphur compounds before the decomposition reaction.

In producing primary products rich in olefines using gases rich in carbon monoxide the gases leaving the generator 29 are freed from their sulphur contents and then mixed with a greater part of the decomposed residual gas leaving the regenerator 31 via line 31a, the mixing taking place in line 41. The remainder of the gas leaves regenerator 31 via line 31b. The gas thus obtained is used as a synthesis gas if necessary after adjusting the ratio of CO : $H_2$.

If residual gas is used alone or in admixture a part of the undecomposed or decomposed gas is taken out of the circulation and used for heating the regenerator or for producing primary products and in the latter case the residual gas is used for heating purposes. The amount of the residual gases so taken out is dependent on the inert content, which is allowable or desirable in the synthesis gases. In producing synthesis gases with an approximate ratio of CO : $H_2$=1:2 the following method is used. Before mixing the sulphur-free water gas (coming from the generator through the sulphur purification plant) with the decomposed gas the water gas or a part of it is sent through a conversion plant and preferably a carbon dioxide washing-out plant or the gas can be mixed with a hydrogen rich gas so as to adjust the ratio of CO : $H_2$ to the required proportion. Instead of converting the water gas the decomposed gas can be converted and freed from carbon dioxide.

If desirable in this case as in other cases catalysts can be used for the decomposition reaction.

5. *Production of synthesis gases from coal*

When using coal for synthesis gas production a generator and three regenerators are preferably used.

The operation is illustrated in Figs. 11 to 14 of the accompanying drawings, in which:

Fig. 11 is a flow sheet which shows a blasting period;

Fig. 12 is a similar flow sheet showing a gas making period,

Fig. 13 is a similar flow sheet showing a second blasting period, and

Fig. 14 is a similar flow sheet showing a second gas making period.

*First gas making period.*—Referring to Fig. 12 of the drawings, steam or carbon dioxide or superheated steam or pre-heated carbon dioxide (heated for instance in a heat exchanger with the sensible heat of the decomposed gases leaving the regenerators 43, 44 or 45 or pre-heated in the regenerators 43 and 45) is brought into the generator 42 which has a mechanically operated grate 1c through lines 46, 47 and 48. The gas is made in the up direction. The gases leaving the reaction zone 42a are used to pre-heat further the coal and to carbonise the same. The gases leaving the generator 42 through line 49 are brought with the necessary amount of steam or carbon dioxide or other gases used in or for the reaction into the regenerator 44 for decomposing. The amount of steam, or carbon dioxide brought into the generator is preferably chosen so high as to be sufficient for the water gas reaction and the decomposing reaction. The sensible heat of the gases leaving the regenerator 44 can be used for superheating the steam and pre-heating carbon dioxide and for heating the regenerators 43 and 45 (alternately) in the gas making period. The regenerators 43 and 45 are used for decomposing the residual gases, coke oven gas and the like.

Thus, in regenerator 43 steam and residual gas are admitted through lines 50 and 51 respectively, the gases produced leaving through line 52. In the regenerator 45 air and fuel are admitted through lines 53 and 54 respectively for heating the regenerator.

*Second blasting period.*—Referring to Fig. 13 of the drawings, air admitted through line 55 pre-heated in the regenerator 43 is brought into the generator 42 which has a mechanically operated grate 1c through line 56. The blast gases leaving the reaction zone 42a are used for pre-heating the coal 42b to a temperature where carbonisation just begins. The blast gases leaving the generator through line 57 are, after addition of secondary air or pre-heated secondary air through line 58 and residual gases or pre-heated residual gases or other fuels through line 59, used for heating the regenerator 44. The regenerator 45 is used for decomposing residual gas admitted through line 62 by steam admitted through line 63.

Referring to Fig. 14 of the drawings, which illustrates the second gas making period, steam or carbon dioxide is admitted through line 46 into the generator 42 which has a grate 1c and the products leave through line 49 and pass to regenerator 44. Regenerator 43 is heated by the admission of fuel through line 60 and air through line 61. Steam admitted through line 62 reacts with residual gas admitted through line 63 in the regenerator 45, the gases produced leaving through line 64.

Referring to Fig. 11 of the drawings, air is introduced through line 65 into the regenerator 45 and passes through line 56 to the generator 42, which has a mechanically operated grate 1c. The blast gases leave the generator by line 67 and pass after the addition of further fuel through line 68 and air through line 69 to the regenerator 44 to heat the same. Steam is admitted through line 50 and residual gas through line 51 to the regenerator 43. The gas produced leaves through line 52.

In a plant consisting of more generator units more suitable conditions of operation can be applied and less regenerators are required per generator unit. This applies to the production of other gases and in using fuels other than coal.

A further modification of the process wherein tar or low temperature tar and synthesis gas can be obtained is described below.

A plant consisting of a generator and one or two regenerators is used.

The plant is operated in the following way:

*Blast period.*—Air or oxygen-containing gases or pre-heated air or oxygen-containing gases are brought into the generator for blasting and the blast gases leave the generator at the side at a point or points level with the end of the reaction zone. From there the blast gases are brought before or after the addition of secondary air into a regenerator to heat the same. The heated regenerator is used for heating the steam, carbon dioxide or the like in the following gas-making period. The air can be pre-heated in a regenerator and/or with the heat stored in the ash.

*Gas making period.*—Steam, carbon dioxide or the like is superheated or pre-heated in the regenerator and is brought into the generator above the grate into the reaction zone. The gases produced and undecomposed steam, carbon dioxide or the like leaving the reaction zone go through the coal bed thus carbonising the coal and the mixture of the gases produced, steam, carbon dioxide, tar and carbonisation gases is brought out at the top of the generator to the regenerator or direct to the cooling or removal plant for tar and other desirable components or impurities. The gas thus obtained is used as synthesis gas either alone or in admixture with decomposed residual gases or other gases. If required the composition of the synthesis gas may be adjusted by the addition of other gases.

6. Production of blue water gas and carburetted water gas from coke

Figs. 15 and 16 of the accompanying drawings illustrate further embodiments of the invention in which the gas is all made in the down direction.

*Blasting period.*—Referring to Fig. 15 of the drawings this illustrates a blasting period in which air is admitted through pipe 67 into the generator 68 having a mechanically operated grate 1c and reaction zone 68a. The air is heated by the ash resting on the grate 1c (the ash being hot from a previous operation) and raises the fuel in the reaction zone to incandescence. The blast gases leaving the generator 68 pass into the regenerator 69 which is heated thereby to a temperature of 1050° C.

*Gas making period.*—Referring to Fig. 16 of the drawings steam is passed through the heated regenerator 69 from the pipe 70 and thence passes into the top of the generator 68. The water gas produced and excess steam leave the generator at a temperature of 1150° C. through pipes 71 and 72 and are collected by manifold 73.

If it is desired to produce carburetted water gas oil is admitted through pipes 74 and 75 into the water gas produced which has a sufficiently high temperature and possesses sufficient sensible heat to crack the oil without further heating. Furthermore if desired a part of the water gas may leave through pipe 76 at the bottom of the generator and the mechanically operated grate 1c may be replaced by a fixed hand operated grate.

The following calculation shows the advantage of the present invention with particular reference to the embodiments shown in Figs. 15 and 16 of the drawings.

I. *Calculation of the coke consumption for generation of blue water gas*

1. Gas production per cycle at 0° C. and 760 mms., 500 cbm.
2. Assumed average temperature of the gases and undecomposed steam leaving the reaction zone 1150° C.
3. Composition of blue water gas:

$CO=42.8\%$; $CO_2=4.0\%$; $H_2=49.3\%$; $CH_4=0.4$; $N_2=3.5\%$; calorific value 2640 cals. per cbm. at 60° F. and 30″.

4. Composition of the blast gases:

$CO=9.5\%$; $CO_2=15.0\%$; $N_2=75.5\%$

5. Heat required for the chemical reaction:

$$R = 1344 CO + 4364 CO_2 - 2570[(CO+2CO_2) - (2\frac{N_g - N_c}{3.78} + 2CH_4)] = 1344 \times 0.428 + 4364 \times 0.04 - 2570 [(0.428 + 2 \times 0.04) - (\frac{3.5 - 0.3}{3.78} + 2 \times 0.04)] = -490 \text{ cals. per cbm.}$$

Assumed 500 cals. per cbm.

6. Carbon converted direct into blue water gas per cbm.:

$Cg = 0.536(CO + CO_2 + CH_4) = 0.536(0.428 + 0.040 + 0.004) = 0.253$ kgs. of carbon per cbm.

7. Sensible heat in the gases and steam leaving the reaction zone: (500 cbm., 150 kgs.)

In the gases per cycle: $500 \times 1150 \times 0.335 = 193,000$
    In the steam per cycle: $150 \times 1150 \times 0.52 = 90,000$ Cals. per cycle_____283,000

In the gases and steam the sensible heat of which is used for carburetting:

$400 \times 1150 \times 0.335 = 154,000$
    $120 \times 1150 \times 0.52 = 72,000$ 226,000

In the gases and steam a part of the sensible heat of which is stored in the ash:

$100 \times 1150 \times 0.325 = 39,000$
    $30 \times 1150 \times 0.52 = 18,000$ 57,000

8. Heat stored in the ash (assuming that the temperature of the gases and undecomposed steam leaving the generator at the bottom is 300° C.).

$(100 \times 1150 \times 0.335 + 30 \times 1150 \times 0.52) - (100 \times 300 \times 0.315 + 30 \times 300 \times 0.456) = 43,000$ cals. per cycle.

9. Heat required for the reaction:

$500 \times 500 = 250,000$ cals. per cycle.

10. Heat required for the production of 500 cbm. of blue water gas without taking into account the heat brought with the coke and steam:

$283,000 + 250,000 = 533,000$ cals. per cycle.

11. Heat brought into the reaction zone with the coke (assuming a coke temperature of 1100° C.):

a. In the gas making cycle 145×1100×0.383 = 61,000 cals.
   b. In the blast cycle 100×1100×0.383 = 43,000 cals.
                                                                    104,000 cals.

12. Heat brought into the reaction zone with the steam:

355×1050×0.510 = 191,000 cals. per cycle.

13. Total heat brought into the reaction zone with steam and coke in the gas making cycle:

191,000+61,000 = 252,000 cals. per cycle.

14. Heat to be stored in the reaction zone by the blast gases:

533,000−252,000 = 281,000 cals. per cycle.

15. Calculation of the amount of heat brought into reaction zone with 1 cbm. of blast gases:

$B = 1344 \times 0.095 + 4364 \times 0.15 + 19 - 0.360 \times 1150 = 654.6 + 127.6 + 19 - 415.2 = 386$ cals. per cbm.

16. Total heat to be brought with the blast gases taking into account the heat brought in with the coke and the air in the blast cycle (the air takes up the heat stored in the ash 43,000 cals.):

283,000−(43,000+43,000) = 197,000 cals. per cycle.

17. Amount of blast gases required to store 197,000 cals. in the reaction zone:

$\frac{197,000}{286} = 510$ cbm. per cycle.

18. Carbon required for generation of 1 cbm. of blast gases:

$C_b = 0.536 (0.095 + 0.15) = 0.131$ kgs. C per cbm.

19. Carbon required in the blast cycle for generation of 1 cbm. blue water gas:

$\frac{510 \times 0.131}{500} = 0.134$ kgs. C.

20. Total carbon consumption per cbm. of blue water gas. Assuming 10% losses in the plant:

(0.253+0.134)+0.1 (0.253+0.134) = 0.426 kgs. of carbon per cmb. of blue water gas
   Or 0.396 kg. of carbon per cbm. (at 30″ and 60° F.)
   Or 0.455 kg. of coke per cbm. (at 30″ and 60° F.).

II. Calculation concerning the oil cracking

1. Average temperature of the gas and undecomposed steam leaving the reaction zone and removed from the generator just below the reaction zone, 1150° C.
2. Temperature at which the cracking is accomplished, 730° C.
3. Undecomposed steam per cbm. of water gas, 0.3 kg.
4. The sensible heat available in 400 cubic metres of water gas and 120 kgs. of steam between the temperatures of 1150 and 730° C. for the cracking of oil:

(400×1150×0.335+120×1150×0.52)−
   (400×730×0.321+120×730×0.485) = 90,000 cals. per cycle.

5. Heat required to crack 1 kg. of oil (oil before being mixed with gas being at 60° C.) mean specific heat of the oil is 0.6 cal. per kgm.

The reaction heat taken for this example as 200 cals. per kg. (the reaction heat differs according to the conditions of cracking and the composition and properties of the oil and gases obtained):

(730−60)×0.6+200 = 600 cals. per kg.

6. The amount of oil which can be cracked per 400 cbm. of water gas and 120 kgs. of undecomposed steam removed from the generator at 1150° C.:

$\frac{90,000}{600} = 150$ kgs. of oil per cycle (equivalent to 75 cbm. of gas from oil).

7. Taking the potential heat of the gas obtained from a gallon (4 kgs.) to be 1.35 therms, the potential heat obtained from cracking 150 kgs. of oil will be:

$\frac{150 \times 1.35 \times 25200}{4} = 1,280,000$ cals. per cycle.

and the calorific value of the gas obtained:

Blue water gas, 500×2640 = 1,320,000
   Oil gas              = 1,280,000
                          2,600,000

$\frac{2,600,000}{500+75} = 4520$ cals. per cbm.

or 508 B. t. u. per 100 cu. ft. (at 30″ and 60° F.)
or oil and coke consumption per 1000 cu. ft. (at 30″ and 60° F.)
24.8 lbs. of coke (21.7 lbs. C) and 1.85 gallons per 100 cu. ft. (at 30″ and 60° F.) 508 B. t. u.

The process of the present invention has a number of advantages. Thus:

(1) The quantity of blast gas is reduced and therefore it is not necessary to produce excess steam in the waste heat boiler.
(2) Owing to the fact that the water gas generator is no longer acting as an inefficient producer of excess process steam the throughput of water gas can be increased in any given unit.
(3) Both the blast gas and water gas are continually passing through the steam boiler during the cycle and therefore the waste heat boiler can be designed more economically.
(4) Since no up run with the steam is necessary the cycle and valve and piping system can be considerably simplified.
(5) There is no need for a jacket boiler on the generator and this leads to simplification of design.
(6) The steps to carry out the process can be incorporated in water gas plants already installed and do not call for very drastic structural alterations.

I claim:

An intermittent process for the manufacture of carburetted water gas in a generator operated to produce an ash bed resting on a grate in the bottom thereof, a reaction zone above the ash bed, formed by blasting the fuel to incandescence, and a fuel bed above the reaction zone, comprising the steps of blasting fuel in said reaction zone to incandescence by means of a blast of air passing in an up direction successively through said grate and said ash bed hot from a previous operation, passing the hot blast gases leaving the top of said reaction zone to a regenerator to heat the same, then initiating the gas making cycle by passing steam through the heated regenerator and thence downwardly through the reaction zone to produce water gas, passing the water gas from said reaction zone downwardly into the ash bed and removing said water gas through an outlet in the generator wall which is located at a fixed point above the grate, regulating the depth of the ash bed between the point of withdrawal of the water gas and the bottom of the reaction zone so as to store therein a large part of the sensible heat of the water gas passing therethrough, utilizing the thus extracted heat from the water gas made in said gas making down run to preheat gases led to said generator through said ash bed in a succeeding up run, and mixing the water gas leaving the generator with a gas containing carbon monoxide and hydrogen which has been obtained by decomposing a hydrocarbon-containing gas mixed with a gas selected from the group consisting of carbon dioxide and steam by passage through a regenerator which has been heated at least partly by means of gases leaving said generator in a blast period.

MICHAEL STEINSCHLAEGER.

REFERENCES CITED

The following references are of record in the file of this patent:

UNITED STATES PATENTS

| Number | Name | Date |
|---|---|---|
| 382,372 | Meeze | May 8, 1888 |
| 1,085,806 | Evans | Feb. 3, 1914 |
| 1,235,777 | Eldred et al. | Aug. 7, 1917 |
| 1,752,036 | Steere | Mar. 25, 1930 |
| 1,758,991 | Willis | May 20, 1930 |
| 1,853,084 | Rosenthal | Apr. 12, 1932 |
| 2,434,444 | Steinschlaeger | Jan. 13, 1948 |

FOREIGN PATENTS

| Number | Country | Date |
|---|---|---|
| 36,715 | Switzerland | Apr. 3, 1906 |
| 577,015 | Great Britain | May 1, 1945 |
| 578,332 | Great Britain | June 25, 1946 |